Aug. 4, 1953  S. P. NEWBERRY, JR  2,647,774
VACUUM SEAL
Filed Oct. 5, 1949
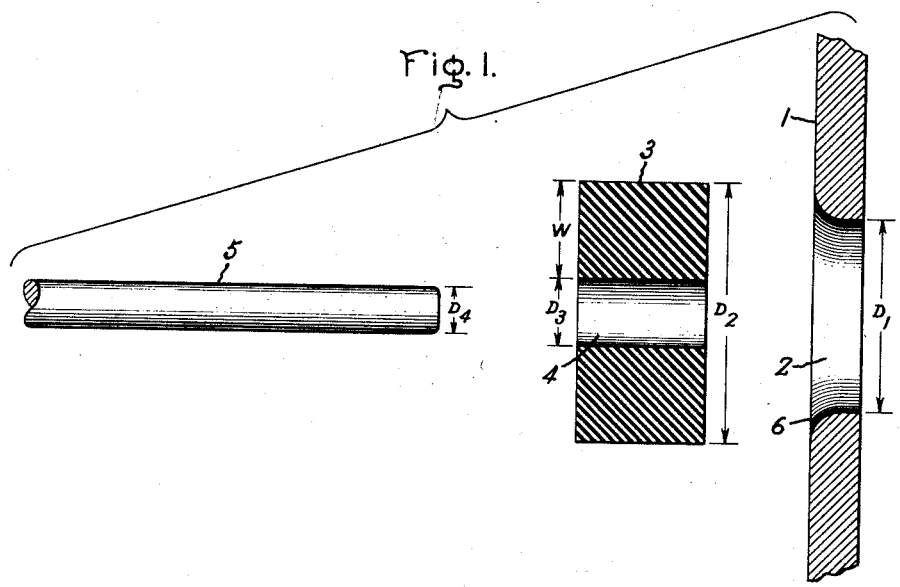
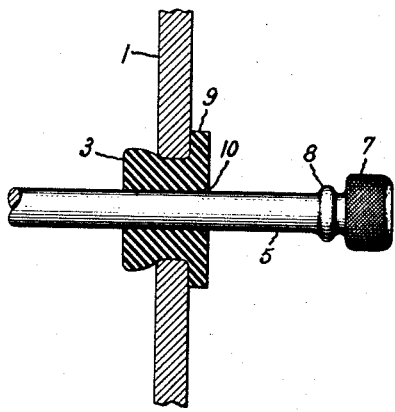
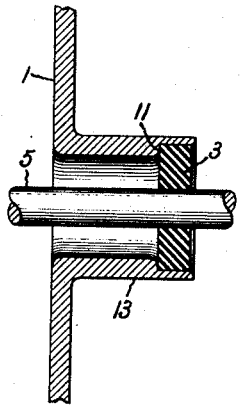
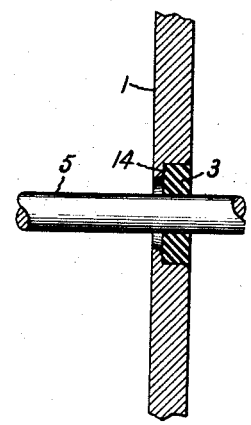
Inventor:
Sterling P. Newberry, Jr,
by *Paul A. Frank*
His Attorney.

Patented Aug. 4, 1953

2,647,774

UNITED STATES PATENT OFFICE 2,647,774

VACUUM SEAL

Sterling P. Newberry, Jr., Schenectady, N. Y., assignor to General Electric Company, a corporation of New York Application October 5, 1949, Serial No. 119,685

4 Claims. (Cl. 286—16)

This invention relates to vacuum sealing means and particularly to such means adapted for the transmission of motion into an evacuated enclosure.

One of the most difficult problems facing those concerned with the vacuum plumbing art has been that of introducing mechanical motion into a vacuum system without admitting an undesired substance, such as air or liquid. Heretofore, several means have been devised for solving this problem whereby motion may be transmitted into an evacuated enclosure through an operating rod movably sealed into an opening in the wall of the enclosure. However, each of these means has required some kinds of special surfaces, clamps, or compression devices in order to provide the necessary seal.

Some of the objects of the present invention are: to provide a seal through which desired mechanical motion may be introduced into a vacuum system without requiring the use of special surfaces, clamps or compression devices; to provide a seal which may be applied in a simple manner to a finished vacuum system; to provide a seal which works positively without backlash; to provide a seal which has a long service life; and to provide a seal which may be cheaply fabricated without the use of special machine tools.

One form of the invention exemplary of the principles thereof more fully described hereinafter includes an elastic grommet disposed within an opening in a wall of an evacuated vessel and an operating rod traversing the bore of the grommet. By maintaining a defined ratio for the web compression of the grommet, successful sealing may be obtained in accordance with the objects of the invention.

The features of the invention desired to be protected herein are pointed out with particularity in the appended claims. The invention itself, together with further objects and advantages thereof, may best be understood by reference to the following description, taken in connection with the accompanying drawings, in which Fig. 1 is a partially sectionalized, exploded view of the invention in unassembled form; and Figs. 2, 3 and 4 are partially sectionalized views of various modifications of the invention in assembled form.

Referring now to Fig. 1, there is shown a plate 1 having an opening 2 therein of generally circular cross-section. Plate 1, while illustrated as being metallic, may be of any suitable material and may be considered as forming a portion of a vacuum vessel which is to be evacuated after opening 2 is suitably sealed. For convenience, it may also be considered that the space lying to the left of plate 1 is on the exterior of the vessel of which plate 1 forms a portion and that it is desired to introduce mechanical motion through plate 1 from the space at the left into the space at the right, such latter space being within the vacuum vessel.

In order to provide means for introducing mechanical motion through opening 2 in vacuum-tight fashion, there is provided a generally cylindrical grommet 3 formed of a suitable elastic material and having a bore 4 through which may be inserted an operating rod 5. To assemble the seal, rod 5 may be inserted through the bore 4 of grommet 3, and then both grommet 3 and rod 5 inserted into opening 2. It is generally more advantageous to place grommet 3 into opening 2 first and then insert rod 5 through bore 4. Various embodiments of the assembled seals are shown in Figs. 2, 3 and 4.

As has been stated heretofore, no special surfaces or compression devices are required to form a seal according to the invention. The circumference of opening 2 in plate 1 should be reasonably smooth but need have no finish better than that produced by an ordinary twist drill. A portion 6 of plate 1 adjacent the exterior circumference of opening 2 may be rounded as indicated to facilitate insertion of grommet 3. Rod 5 should also be reasonably smooth and have a continuous surface free from large pits, longitudinal scratches or other blemishes. If rod 5 is of metallic material, it may be plated with a non-corrosive substance such as chromium and polished in a manner well known to those skilled in the art. Grommet 3 may consist of a suitable synthetic elastomer having a low vapor pressure, such as polymethylsiloxane, neoprene, or polyvinyl chloride. The fabrication of grommet 3 may be accomplished in any manner well known to those skilled in the art, such as by molding, punching or cutting from solid stock.

In order to secure effective sealing in accordance with the principles of the invention, the dimensions of the various elements heretofore described must be arranged to provide the proper sealing pressure when the seal is assembled. For purposes of explanation, the diameter of opening 2 is indicated as $D_1$, the diameter of grommet 3 before assembly as $D_2$, the diameter of the bore 4 before assembly as $D_3$, the web thickness of grommet 3 before assembly as $W$, and the diameter of rod 5 as $D_4$. By observing the following inequality series $$D_2 > D_1 > D_3 > D_4$$

it may be assured that the packing pressure between plate 1 and grommet 3 is greater than the pressure between rod 5 and grommet 3 when the seal is assembled. This condition causes grommet 3 to remain in place without extra retaining rings, special surfaces, etc. and also places the greatest pressure where it is most needed since it is, as a practical matter, easier to obtain a smooth surface on rod 5 than on the circumference of opening 2. A limit is reached when $D_2$ is too large to permit easy forcing of grommet 3 into opening 2. Of course, before sealing can be expected, the diameter $D_4$ of rod 5 must be greater than the reduced diameter $D_3$ of bore 4 when grommet 3 is placed within opening 2.

All these criteria may be effectively met by maintaining the amount of compression of grommet 3 after the seal is assembled within certain limits. These limits may be expressed by reference to the web compression ratio defined as $$\frac{W \text{ before assembly} - W \text{ after assembly}}{W \text{ before assembly}}$$

or as $$\frac{(D_2-D_3)-(D_1-D_4)}{(D_2-D_3)}$$

If this ratio is maintained between about 4% and 20%, operating rod 5 will be sealed within opening 2 in a vacuum-tight relation which permits any desired motion to be transmitted through plate 1.

In Figs. 2, 3 and 4 there are shown modifications of seals assembled in accordance with the invention. For convenience, elements corresponding to similar elements shown in Fig. 1 are similarly identified. In Fig. 2 operating rod 5 is sealed within an opening in plate 1 by means of grommet 3. Rod 5 may have knurled end 7 and a motion limiting collar 8 to prevent insertion too far into the bore of grommet 3. Grommet 3 may have a shoulder 9 abutting the exterior surface of plate 1 to assure its remaining in place, although such is not essential unless extremely rough usage is contemplated. A recess 10 may be provided for the retention of a suitable lubricant whereby movement of rod 5 may be facilitated.

The modification illustrated in Fig. 3 may be employed for certain purposes which make it desirable to displace the seal from the wall of the vacuum vessel. As shown, grommet 3 is disposed within a recess 11 in a sleeve 13 joined to plate 1 in any convenient manner. In Fig. 4 there is shown a modification employing a recess 14 in plate 1 to retain grommet 3.

With a seal constructed according to the invention, motion of translation, rotation, and pivoting or canting may be transmitted separately, or concurrently, through an operating rod into an evacuated enclosure without admitting undesired substances. Restraints to limit or guide one or more of these motions may be imposed upon rod 5 outside the vacuum enclosure in any desired fashion, e. g., a key may limit rotation but not linear motion. When long linear motion is transmitted, it is desirable to lubricate operating rod 5 with a suitable vacuum grease. Permanent lubrication may be obtained by coating rod 5 with a thin film of polytetrafluoroethylene. No lubricant which may contaminate the vacuum system should be employed. If only rotation is transmitted through rod 5, no lubrication is necessary. Similarly, if rod 5 is moved only sporadically, or for that matter, left substantially stationary, no lubrication is necessary.

As stated heretofore, any suitable elastomer may be employed as material for grommet 3. However, such elastomer should not stress relieve itself appreciably within the desired life of the seal and should not have a vapor pressure in excess of the ultimate vacuum desired within the vacuum vessel.

What I claim as new and desire to secure by Letters Patent of the United States is:

1. Vacuum-tight means for transmitting motion into an evacuated vessel comprising an elastic grommet disposed within an opening in a wall of the vessel and a rod traversing the bore of said grommet, the diamensions of said opening being less than the outside dimensions of said grommet, and the dimensions of the bore in said grommet being greater than the cross-sectional dimension of said rod with said grommet having a web compression ratio of between about 4% and 20% the web compression ratio of the grommet being defined by the following relation:

$$\frac{(D_2-D_3)-(D_1-D_4)}{(D_2-D_3)}$$

wherein $D_2$ is the outside dimension of the grommet, $D_1$ is the dimension of the opening in the wall, $D_3$ is the dimension of the bore in said grommet, and $D_4$ is the cross-sectional dimension of the rod.

2. Vacuum-tight means for transmitting motion into an evacuated vessel comprising an elastic grommet disposed within a recessed opening in a wall of the vessel and a rod traversing the bore of said grommet, the dimensions of said opening being less than the outside dimensions of said grommet, and the dimensions of the bore in said grommet being greater than the cross-sectional dimension of said rod with said grommet having a web compression ratio of between about 4% and 20% the web compression ratio of the grommet being defined by the following relation:

$$\frac{(D_2-D_3)-(D_1-D_4)}{(D_2-D_3)}$$

wherein $D_2$ is the outside dimension of the grommet, $D_1$ is the dimension of the opening in the wall, $D_3$ is the dimension of the bore in said grommet, and $D_4$ is the cross-sectional dimension of the rod.

3. Vacuum-tight means for transmitting motion into an evacuated vessel comprising an elastic grommet disposed within an opening of generally circular cross-section in a wall of the vessel and a substantially cylindrical rod traversing the bore of said grommet, the diameter of said opening being less than the outside diameter of said grommet, and the diameter of the bore in said grommet being greater than the diameter of said rod with said grommet having a web compression ratio of between about 4% and 20% the web compression ratio of the grommet being defined by the following relation:

$$\frac{(D_2-D_3)-(D_1-D_4)}{(D_2-D_3)}$$

wherein $D_2$ is the outside diameter of the grommet, $D_1$ is the diameter of the opening in the wall, $D_3$ is the diameter of the bore in said grommet, and $D_4$ is the cross-sectional dimension of the rod.

4. Vacuum-tight means for transmitting motion into an evacuated vessel comprising an elastic grommet disposed within an opening of generally circular cross-section in a wall of the vessel and a substantially cylindrical rod traversing the bore of said grommet, the diameter of said opening being less than the outside diameter of said grommet, and the diameter of the bore in said grommet being greater than the diameter of said rod with said grommet having a shoulder abutting the exterior surface of the wall of the vessel adjacent the opening therein and a web compression ratio of between about 4% and 20% the web compression ratio of the grommet being defined by the following relation:

$$\frac{(D_2-D_3)-(D_1-D_4)}{(D_2-D_3)}$$

wherein $D_2$ is the outside diameter of the grommet, $D_1$ is the diameter of the opening in the wall, $D_3$ is the diameter of the bore in said grommet, and $D_4$ is the cross-sectional dimension of the rod.

STERLING P. NEWBERRY, Jr.

References Cited in the file of this patent

UNITED STATES PATENTS

| Number | Name | Date |
|---|---|---|
| 362,355 | Bradford | May 3, 1887 |
| 1,336,030 | Gammeter | Apr. 6, 1920 |
| 1,355,318 | Drew | Oct. 12, 1920 |
| 1,697,814 | Forbes | Jan. 1, 1929 |
| 2,188,855 | Chievetz | Jan. 30, 1940 |
| 2,399,550 | Klein | Apr. 30, 1946 |

FOREIGN PATENTS

| Number | Country | Date |
|---|---|---|
| 499,603 | Great Britain | Jan. 26, 1929 |